United States Patent
Lavado et al.

(10) Patent No.: US 9,903,777 B2
(45) Date of Patent: Feb. 27, 2018

(54) PRESSURE TRANSDUCER

(71) Applicant: Sensata Technologies, Inc., Attleboro, MA (US)

(72) Inventors: Michael J. Lavado, Griswold, CT (US); Amin Younes, Providence, RI (US); Stephanie Altrui, Providence, RI (US); Christian Pellon, Norton, MA (US); Timothy Janek, Newton, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 100 days.

(21) Appl. No.: 15/047,063

(22) Filed: Feb. 18, 2016

(65) Prior Publication Data
US 2016/0265998 A1 Sep. 15, 2016

Related U.S. Application Data

(63) Continuation-in-part of application No. 14/694,044, filed on Apr. 23, 2015.

(60) Provisional application No. 62/132,171, filed on Mar. 12, 2015.

(51) Int. Cl.
| | |
|---|---|
| *G01L 9/12* | (2006.01) |
| *G01L 7/00* | (2006.01) |
| *G01L 9/00* | (2006.01) |
| *G01L 19/00* | (2006.01) |
| *G01L 19/14* | (2006.01) |

(52) U.S. Cl.
CPC .......... *G01L 9/0075* (2013.01); *G01L 9/0072* (2013.01); *G01L 19/0069* (2013.01); *G01L 19/142* (2013.01)

(58) Field of Classification Search
None
See application file for complete search history.

(56) References Cited

U.S. PATENT DOCUMENTS

| | | |
|---|---|---|
| 4,888,662 A | 12/1989 | Bishop |
| 4,903,164 A | 2/1990 | Bishop et al. |

(Continued)

OTHER PUBLICATIONS

European Search Report for European Patent Application No. 16157200.3, dated Aug. 22, 2016, 7 pages.

*Primary Examiner* — Peter Macchiarolo
*Assistant Examiner* — Jermaine Jenkins
(74) *Attorney, Agent, or Firm* — Burns & Levinson LLP; Joseph Maraia; Daniel J. McGrath (57) ABSTRACT

In an embodiment, a pressure transducer includes a first portion, a second portion, and a third portion. The third portion is positioned in a cavity contained in the second portion. In addition, a seal is placed in the cavity. The first portion and second include provisions for applying a downward pressure on the third portion when the first portion and the second portion are joined. The downward pressure is applied by the third portion to the seal the cavity. The first portion also includes a stop and the second portion also includes a snap member. The snap member includes a prong that contains a first edge and a second edge. The snap member allows movement of the first portion after the first edge of the prong meets the stop and restricts movement of the first portion after the second edge of the prong meets the stop.

18 Claims, 12 Drawing Sheets

(56) References Cited

U.S. PATENT DOCUMENTS

| | | | | |
|---|---|---|---|---|
| 5,060,108 | A | * | 10/1991 | Baker .................... G01L 9/0075 361/283.4 |
| 5,184,107 | A | * | 2/1993 | Maurer ............... G01L 19/0084 29/621.1 |
| 5,284,107 | A | | 2/1994 | Milne et al. |
| 5,331,857 | A | | 7/1994 | Levine et al. |
| 5,349,865 | A | | 9/1994 | Kavli et al. |
| 5,869,766 | A | | 2/1999 | Cucci et al. |
| 6,439,058 | B1 | * | 8/2002 | Aratani ................. G01L 19/003 73/754 |
| 6,715,357 | B2 | * | 4/2004 | Ishiguro .............. G01L 19/0084 73/715 |
| RE38,557 | E | | 7/2004 | Englund et al. |
| 6,945,118 | B2 | * | 9/2005 | Maitland, Jr. ......... G01L 9/0051 73/754 |
| 8,024,978 | B2 | * | 9/2011 | Khemet ................ G01L 9/0051 73/715 |
| 8,164,007 | B2 | * | 4/2012 | Speldrich .......... B29C 45/14336 174/541 |
| 9,003,897 | B2 | * | 4/2015 | Wade ........................ G01L 1/18 73/862.621 |
| 2014/0338448 | A1 | | 11/2014 | Ashino |

* cited by examiner

PRESSURE TRANSDUCER

RELATED APPLICATIONS

This application claims priority to and the benefit of U.S. Provisional Patent Application No. 62/132,171 titled "PRESSURE TRANSDUCER", which was filed on Mar. 12, 2015, the contents of which are incorporated by reference as though fully set forth herein. This application also claims priority to and is a continuation-in-part of U.S. patent application Ser. No. 14/694,044 titled "PRESSURE TRANSDUCER", which was filed on Apr. 23, 2015, the contents of which are incorporated by reference as though fully set forth herein.

BACKGROUND

A pressure transducer is a device that measures pressure. The pressure measured by a pressure transducer is often output by the pressure transducer in the form of a signal such as, an electrical signal. For example, some pressure transducers employ strain gauges that are wired into Wheatstone bridge configurations and bonded to a diaphragm. Here, pressure applied to a pressure transducer produces a deflection of the diaphragm which introduces strain to the gages. The strain to the gauges produce an electrical resistance change in the gauges proportional to the pressure. This electrical resistance change is often output from the pressure transducer in the form of an analog electrical signal.

Some pressure transducers are assembled using parts that are crimped. For example, some pressure transducers use metal components that are crimped during the assembly of the pressure transducers. Here, the crimp may be used to set a position of a seal that is employed by the pressure transducer to prevent contaminants from entering the pressure transducer. Crimping one or more components during the assembly of a pressure transducer often adds to the cost and/or complexity of assembling the pressure transducer.

BRIEF DESCRIPTION OF THE DRAWINGS

The accompanying drawings, which are incorporated in and constitute a part of this specification, illustrate one or more embodiments described herein and, together with the description, explain these embodiments. The components of the drawings are not necessarily drawn to scale, the emphasis instead being placed upon illustrating principles of the present disclosure. In the drawings.

DETAILED DESCRIPTION

Features described herein may be used, for example, in the manufacture of pressure transducers. The pressure transducers may be used in a myriad of applications. For example, the pressure transducers may be used to measure oil pressure in an automobile or boiler pressure in a boiler.

In an embodiment, a pressure transducer includes a first portion, a second portion, and a third portion. The first portion includes provisions for accommodating a connector that may electrically connect the pressure transducer to an external device (e.g., a computer). The first portion also includes provisions for joining with the second portion during an assembly of the pressure transducer. Moreover, the first portion includes provisions for seating the third portion such that the third portion compresses a seal that is used to seal the third portion from contaminants that may be external to the pressure transducer.

The second portion includes provisions for joining with the first portion without requiring a crimp operation. Moreover, the second portion includes provisions for accommodating the third portion and the seal. In addition, the second portion includes provisions for providing pressure to be measured by the pressure sensor to a sensing element contained in the pressure sensor. The second portion also includes provisions for mounting the pressure sensor.

The third portion includes provisions for measuring pressure and generating a signal based on the measured pressure. The generated signal includes an electronic signal that represents the measured pressure.

Figure 1A:
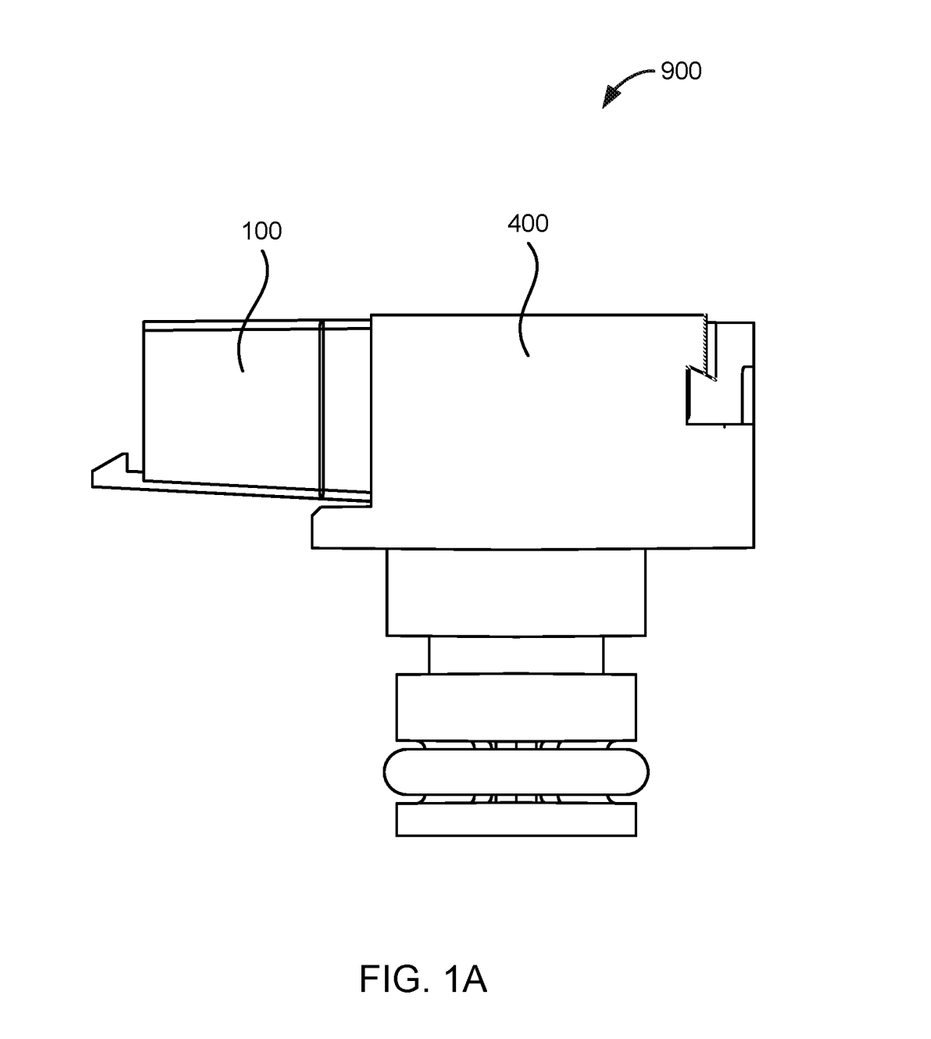
FIG. 1A illustrates an example embodiment of a pressure transducer.

FIG. 1A illustrates an example embodiment of a pressure transducer 900. The pressure transducer 900 includes a first portion 100 and a second portion 400. As will be described further below, the first portion 100 includes, inter alia, provisions to accommodate a connector that may be connected to the pressure transducer 900. The connector may carry a signal generated by the pressure transducer 900 to an external device such as, for example, a computer.

Also, as will be described further below, the second portion 400 includes, inter alia, provisions to accommodate seating of a third portion of the pressure transducer 900. In an embodiment, the third portion is an electronic module assembly (EMA) that contains electronic components (e.g., integrated circuits, resistors, capacitors, sense element) for measuring a pressure that is introduced into a channel contained in the pressure transducer 900. The third portion is seated against a seal contained in the pressure transducer 900.

Figure 1B:
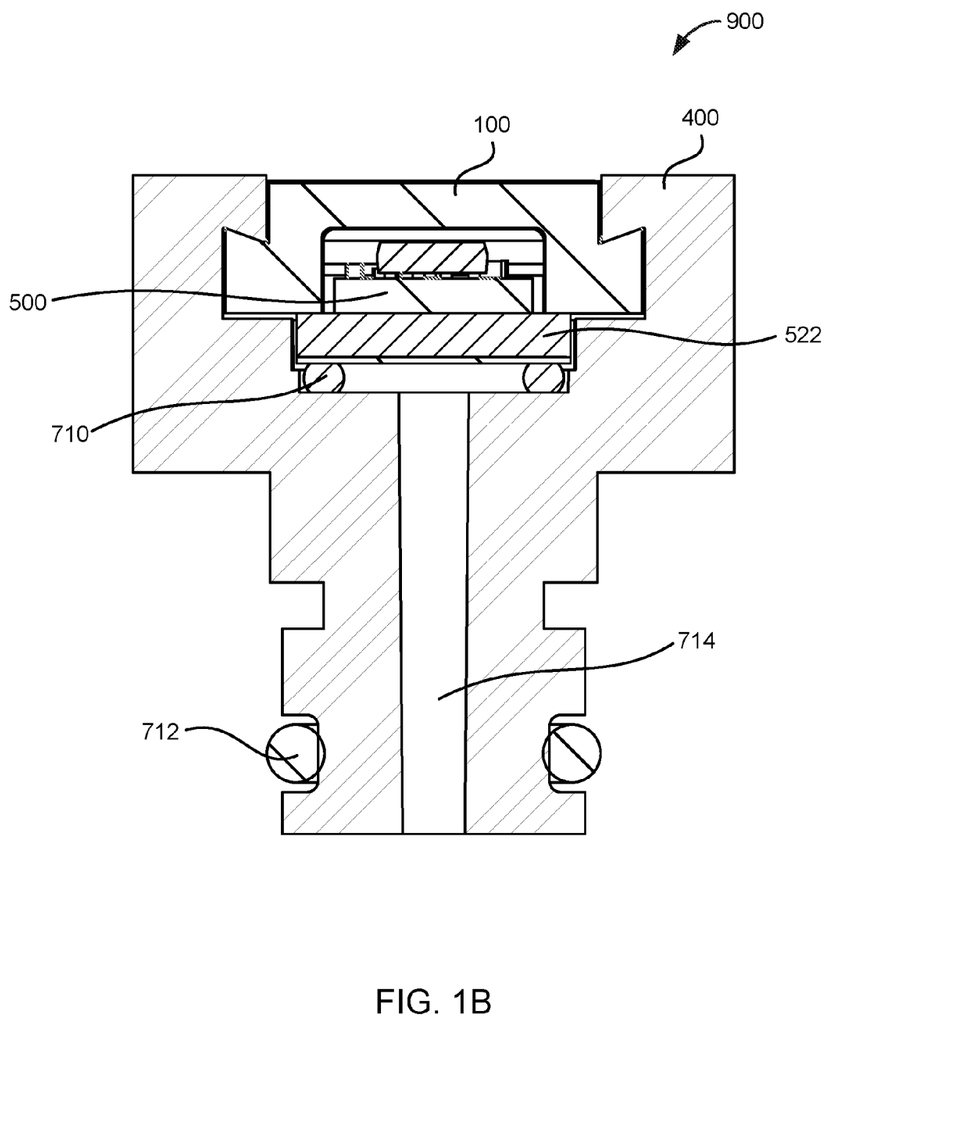
FIG. 1B illustrates an example cross-sectional view of the pressure transducer.

FIG. 1B illustrates an example cross-sectional view of the pressure transducer 900. Referring to FIG. 1B, an example placement of the first portion 100, the second portion 400, and the third portion 500 in the pressure transducer 900 is illustrated. Note that in this example placement, the first portion 100 (1) makes contact with the third portion 500 and (2) provides a downward pressure on the third portion 500. This downward pressure is applied to seal 710 by the third portion 500. The seal 710 may be, for example, an O-ring seal. The downward pressure compresses seal 710. The compressed seal 710 acts to seal the third portion 500 from contaminates (e.g., dirt, metal fragments) that may enter the pressure transducer 900 via channel 714 and potentially affect an operation of the third portion 500.

Channel 714 allows pressure from outside the pressure transducer 900 to enter the pressure transducer 900. This pressure is applied to a sense element (described further below) which in this embodiment is part of the third portion 500. Also note that the pressure transducer 900 contains a mounting seal 712 that acts to provide a seal for the pressure transducer 900 when the pressure transducer 900 is mounted to a device (e.g., an engine, a boiler). The mounting seal 712 may be, for example, an O-ring seal.

Figure 2:
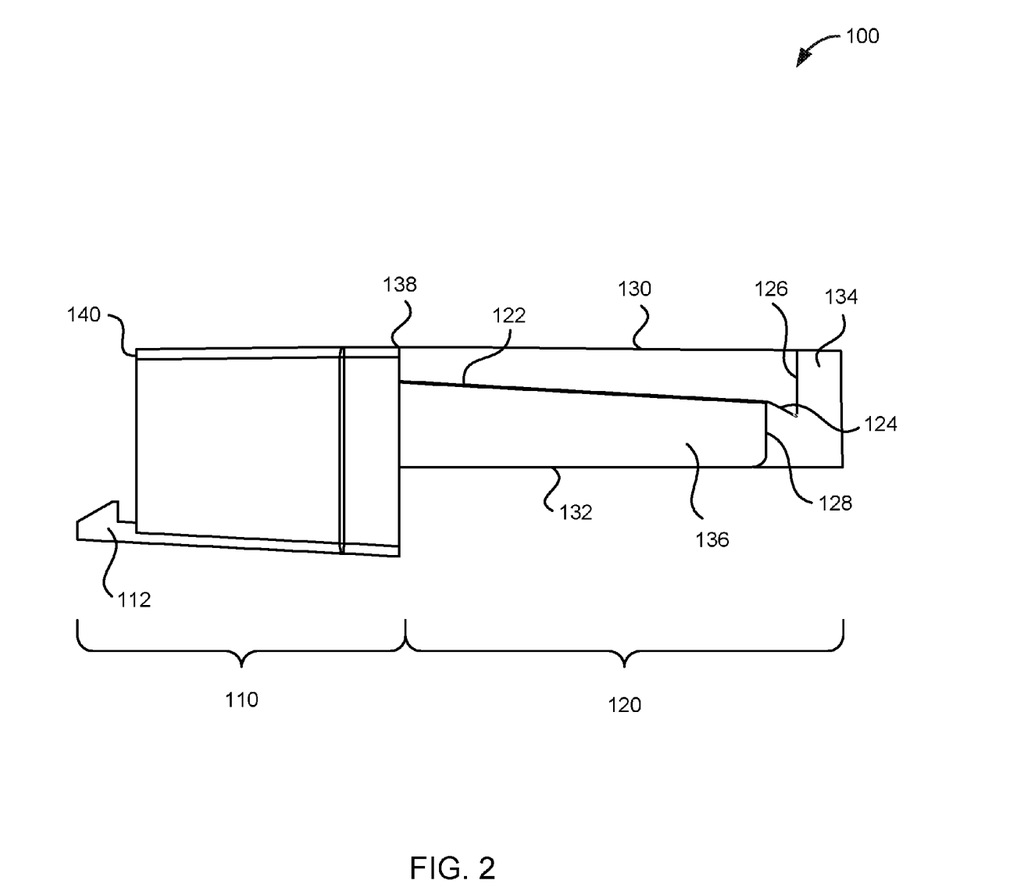
FIG. 2 illustrates a first view of an example embodiment of a first portion of the pressure transducer.

FIG. 2 illustrates a first view of an example embodiment of the first portion 100. Referring to FIG. 2, the first portion 100 includes a connector section 110 and a keyed section 120.

The connector section 110 is at a connector end 140 of the first portion 100. The connector section 110 accommodates a connection between the pressure transducer 900 and the external device. The connection may be an electrical connection that may enable electrical signals (e.g., analog signals, digital signals) generated by the pressure transducer 900 to be transferred between the pressure transducer 900 and the external device. The connector section 110 includes a locking mechanism 112 (e.g., a clip) that may be used to secure the connection.

The keyed section 120 includes provisions to accommodate joining the first portion 100 with the second portion 400. Moreover, the first portion 100 includes provisions for seating the third portion 500 in the second portion 400 and against seal 710. Example embodiments of the second portion 400 and the third portion 500 will be described further below. In addition, examples techniques for (1) joining the first portion 100 with the second portion 400 and (2) seating the third portion 500 in the second portion 400 will be described further below.

The keyed section 120 includes a top surface 130, a bottom surface 132, a face 134, and a key 136. The top surface 130 and the bottom surface 132 may be flat. As will be described further below, the bottom surface 132 makes contact with the third portion 500 and provides a force (e.g., downward force) that enables the third portion 500 to be seated in the second portion 400.

Point 138 is at a first end of the keyed section 120. The first end is located at a point where the keyed section 120 meets the connector section 110. Face 134 is at a second end of the keyed section 120. The second end is opposite the first end. The face 134 is keyed to accommodate joining the first portion 100 with the second portion 400. Moreover, the face 134 is curved to follow a shape of the second portion 400.

The key 136 is formed by edges 122, 124, 126, and 128. Edge 122 is sloped downward from where the connector section 110 meets the keyed section 120 towards the face 134. In an embodiment, the slope of edge 122 is defined based on (1) accommodating the joining of the first portion 100 with the second portion 400 and (2) an amount of pressure the first portion 100 applies to the third portion 500. This pressure may include (1) a pressure that is applied by the first portion 100 to the third portion 500 when the pressure transducer 900 is assembled and (2) a pressure that is applied by the first portion 100 to the third portion 500 after the pressure transducer 900 is assembled. Note that edge 122 slopes at an angle from point 138 towards the face 134. The angle may be, for example, between 0 and 45 degrees although other angles may be used.

Edge 128 defines a first side of key 136. At a first end, edge 128 is adjacent to the bottom surface 132. At a second end (opposite the first end of edge 128), edge 128 is adjacent to a first edge 124. Edge 126 defines a second side of key 136. At a first end, edge 126 is adjacent to the top surface 130. At a second end (opposite the first end of edge 126), edge 126 is adjacent to a second end of edge 124, where the first end of edge 124 is opposite the second end of edge 124.

Edge 124 slopes downward towards edge 126. In other embodiments, edge 124 may slope upward towards edge 126 or not slope at all (e.g., edge 124 may be perpendicular with edge 126). The slope of edge 124 may be defined based on, for example, reducing lateral motion of the first portion 100 when joining the first portion 100 with the second portion 400. Note that edge 124 slopes at an angle from the edge 122 towards edge 126. The angle may be, for example, between 0 and 90 degrees although other angles may be used.

Figure 3:
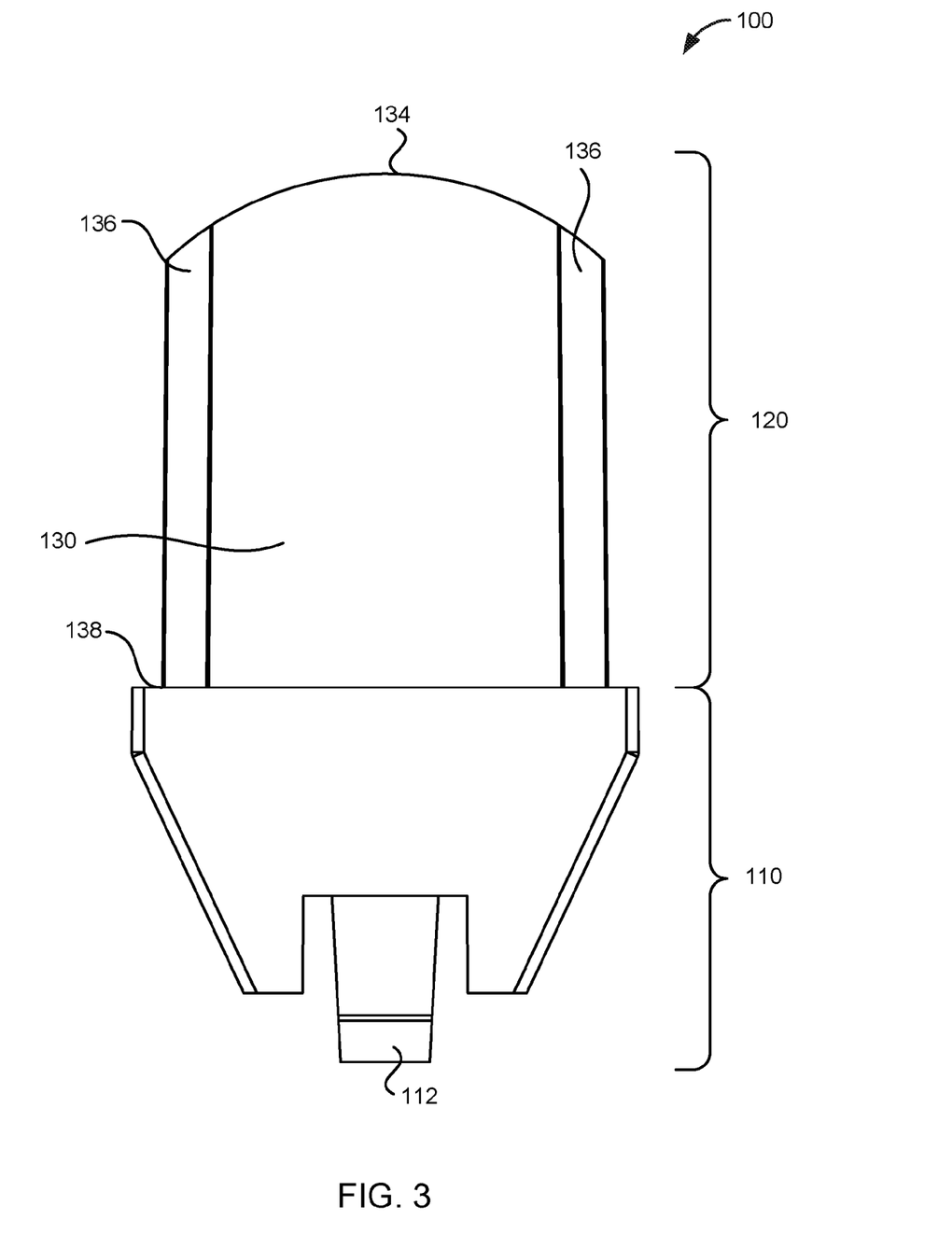
FIG. 3 illustrates a second view of the first portion.

FIG. 3 illustrates a top-down view of the first portion 100. Referring to FIG. 3, note that the top-down view shows a position of the keys 136 with respect to the top surface 130. Moreover, the top-down view shows an example curving of the face 134. In this embodiment, the curving matches a curving of the second portion 400 such that after the pressure transducer 900 is assembled, the face 134 is flush with the outer surface of the second portion 400.

In the connector section 110, the top-down view further illustrates a size and shape of the connector section 110 with respect to a size and shape of the keyed section 120. Note that the sides of the connector section 110 extend further outward than the keyed section 120. The sides extending further outward than the keyed section enables the connector section 110 to act as a stop when the first portion 100 is joined with the second portion 400. Also note that in FIG. 3, a different perspective of locking mechanism 112 is illustrated.

Figure 4A:
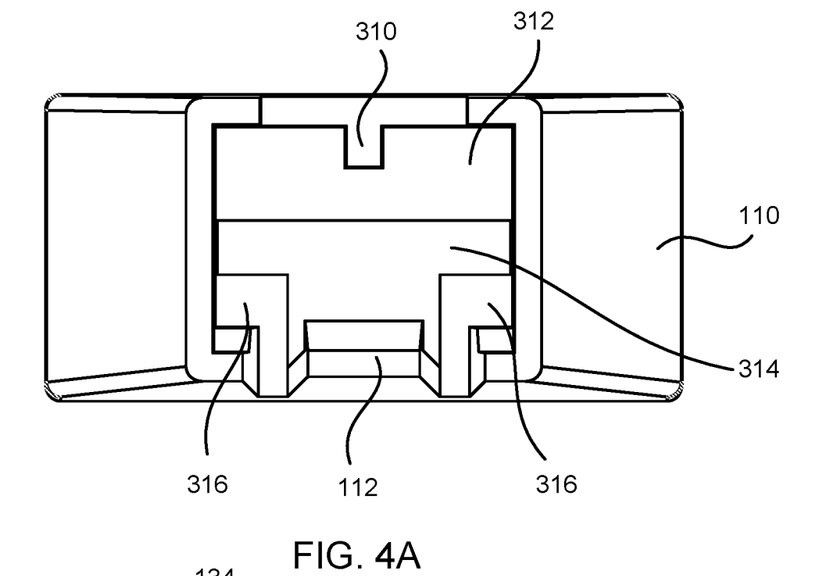
FIGS. 4A-B illustrate head-on views of the first portion.
Figure 4B:
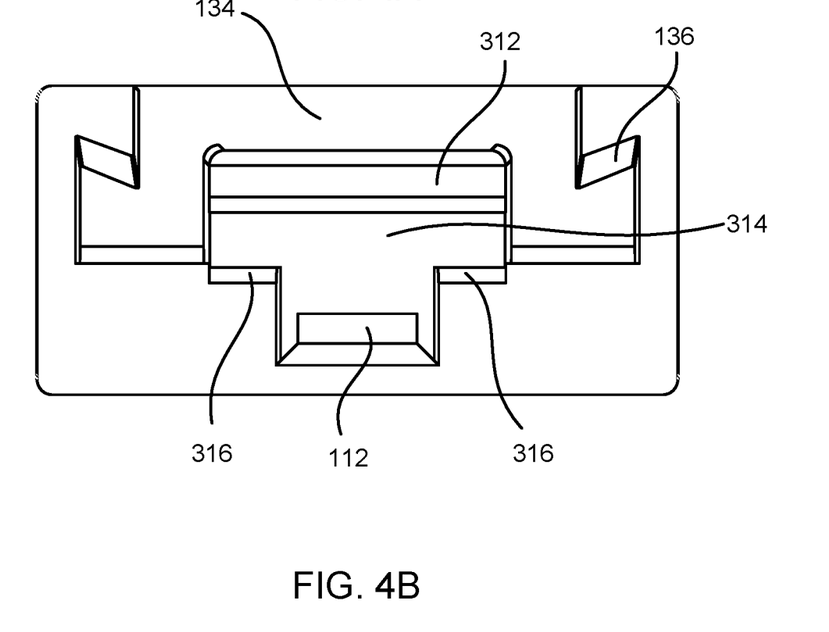

FIGS. 4A-B illustrate head-on views of the first portion 100. Specifically, FIG. 4A illustrates a head-on view looking from the connector section 110 towards the keyed section 120 and FIG. 4B illustrates a head-on view looking from the keyed section 120 towards the connector section 110.

Referring to FIGS. 4A-B, the first portion 100 includes a key 310, a stop 312, an opening 314, and pedestals 316. The key 310 acts to orient and guide a connector that may be connected to the pressure transducer 900 at the connector section 110. The connector may be secured using locking mechanism 112.

Stop 312 is used to guide and constrain a movement of the third portion 500. As will be described further below, the third portion 500 includes a circuit board. Stop 312 acts to accommodate guiding the circuit board through opening 314 as the first portion 100 is joined with the second portion 400. Moreover, after the first portion 100 is joined with the second portion 400, stop 312 acts to constrain movement of the circuit board.

Opening 314 is provided to accommodate the third portion 500. After the first portion 100 and the second portion 400 are joined, a portion of the circuit board associated with the third portion 500 passes through opening 314. That portion of the circuit board includes electrically conductive terminals which provide an electrical connection between circuitry on the circuit board and a connector connected at the connector section 110.

Pedestals 316 act to accommodate guiding the circuit board through opening 314. Moreover, pedestals 316 act to provide a resting point for the circuit board after the first portion 100 is joined with the second portion 400.

Figure 5:
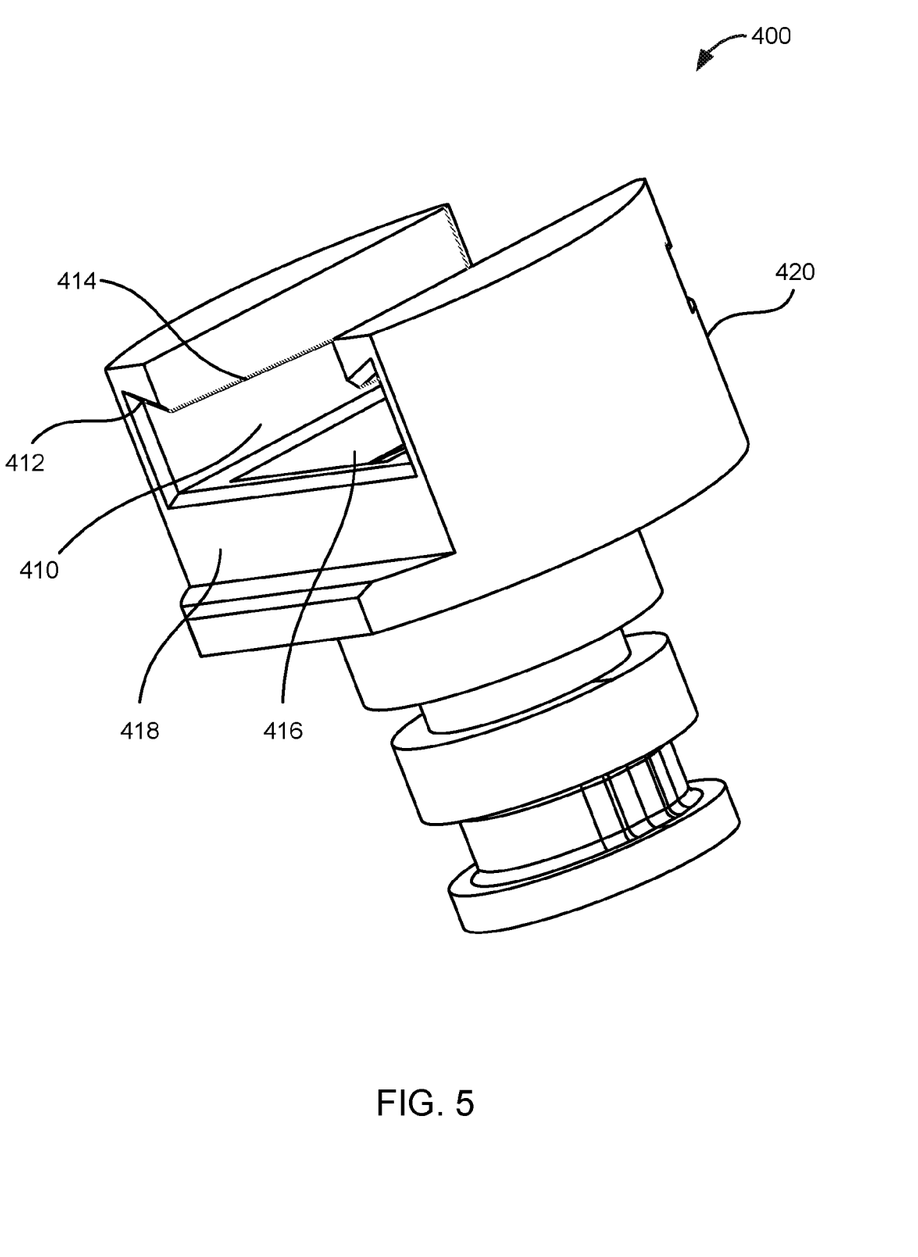
FIG. 5 illustrates an example embodiment of a second portion of the pressure transducer.

FIG. 5 illustrates an example embodiment of the second portion 400 of the pressure transducer 900. Referring to FIG. 5, the second portion 400 includes an opening 410, a cavity 416, and an edge 414.

The opening 410 is shaped to receive the first portion 100 during the assembly of the pressure transducer 900. Opening 410 includes an edge 412 which, for example, acts to align the first portion 100 with the second portion 400 during the assembly of the pressure transducer 900. For example, as will be described further below, assembling the pressure transducer 900 includes joining the first portion 100 with the second portion 400. Here, for example, edge 412 acts to align the first portion 100 with the second portion 400 as the first portion 100 is joined with the second portion 400.

Edge 414 is sloped downward from the front side 418 of the second portion 400 towards the back side 420 of the second portion 400. The front side 418 includes a point where the first portion 100 begins to join with the second portion 400. The back side 420 includes a point where the first portion 100 and the second portion 400 are completely joined.

The cavity 416 is shaped to receive the third portion 500. Moreover, cavity 416 contain provisions to accommodate seal 710, which as shown in FIG. 1B is placed in the cavity 416 between the third portion 500 and channel 714.

A slope of edge 414 may be defined based on, for example, a desired motion of the first portion 100 when joining the first portion 100 with the second portion 400. This desired motion may act to accommodate a seating of the third portion 500 in cavity 416. Seating the third portion 500 in the cavity 146 causes the third portion 500 to apply pressure to the seal 710 to, for example, compress the seal 710. Compressing seal 710 may prevent contaminants from entering the cavity 416 via channel 714.

Figure 6:
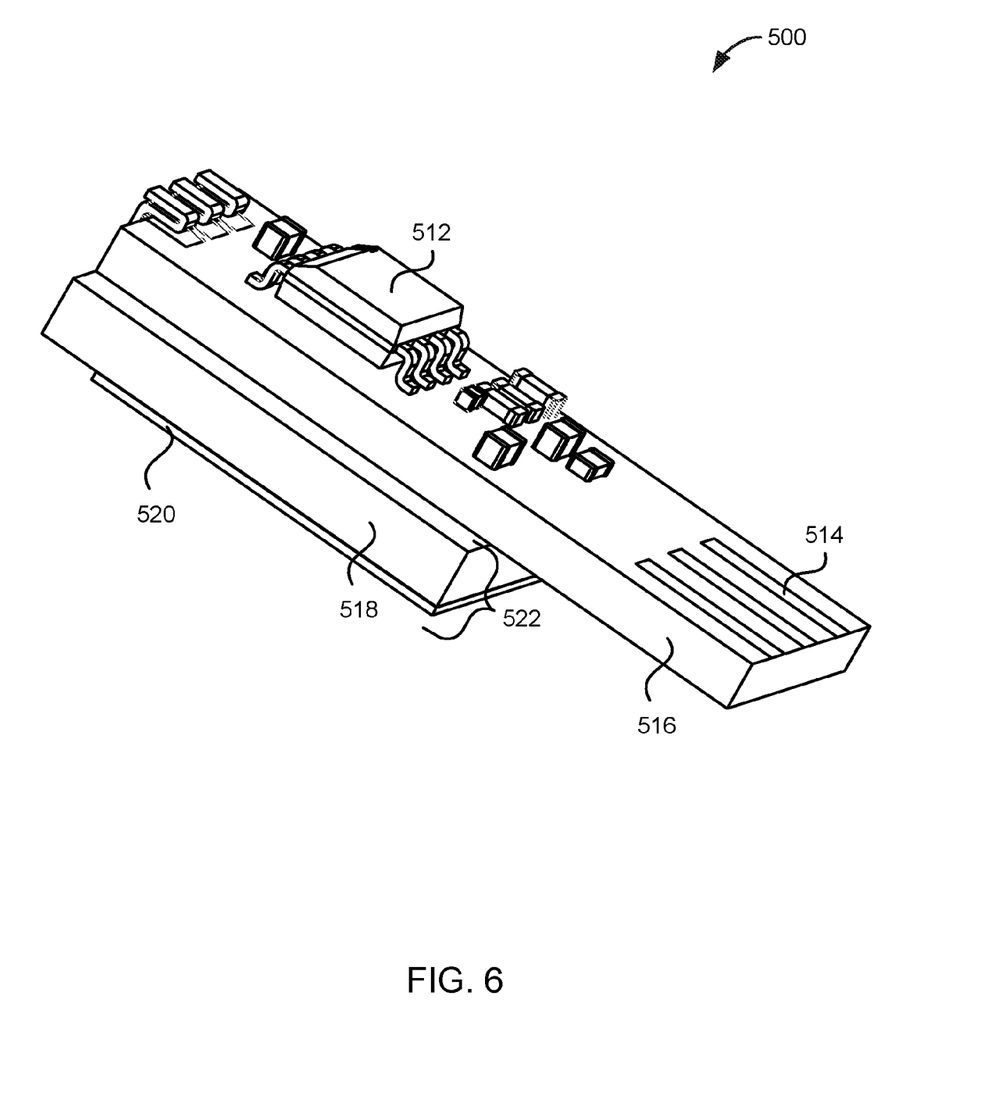
FIG. 6 illustrates an example embodiment of a third portion of the pressure transducer.

FIG. 6 illustrates an example embodiment of the third portion 500 of the pressure transducer 900. The third portion 500 includes electronic circuitry 512, terminals 514, a circuit board 516, and a sense element 522.

Electronic circuitry 512 includes electronic components (e.g., integrated circuits, resistors, capacitors) for receiving a reading (e.g., capacitance value) from the sense element 522 and generating a signal based on the reading. The signal may represent a pressure sensed by the pressure transducer 900. The electronic components may be mounted on circuit board 516. The terminals 514 may be electrically conductive connections that may transfer the signal generated by the electronic circuitry 512 to an external device (e.g., a computer) connected to the pressure transducer 900.

Sense element 522 includes a ceramic substrate 518 and a ceramic diaphragm 520. Ceramic substrate 518 is a substrate for the ceramic diaphragm. Ceramic substrate 518 is rigid and provides a platform for the ceramic diaphragm 520. The ceramic diaphragm 520 is a diaphragm for the sense element 522. Ceramic diaphragm 520 flexes based on a pressure applied to the ceramic diaphragm 520. A capacitance associated with the sense element 522 varies based on a flexing of the ceramic diaphragm 520.

Operationally, in an embodiment, pressure is introduced into the pressure transducer 900 via channel 714 (FIG. 1B) and applied to the sense element 522. The pressure causes the ceramic diaphragm 520 to flex. A capacitance of the sense element 522 varies based on the flexing of the ceramic diaphragm 520. The capacitance is read and processed by the electronic circuitry 512 which produces a signal based on the capacitance. The signal is transferred via terminals 514 from the third portion 500 to an external device connected to the pressure transducer 900.

Figure 7A:
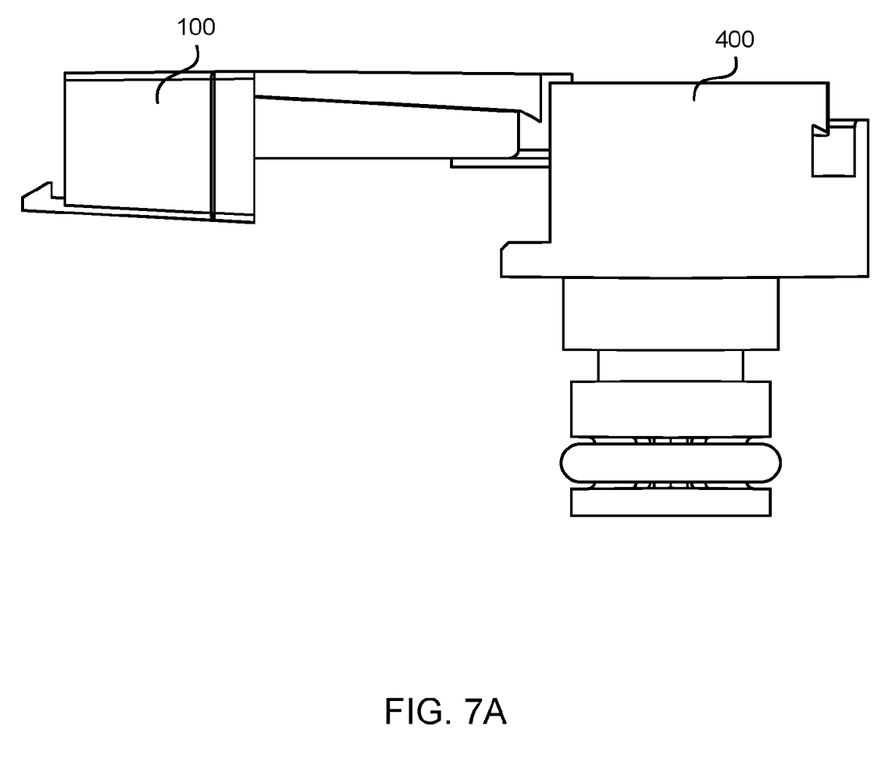
FIGS. 7A-B illustrate an example technique for assembling the pressure transducer.
Figure 7B:
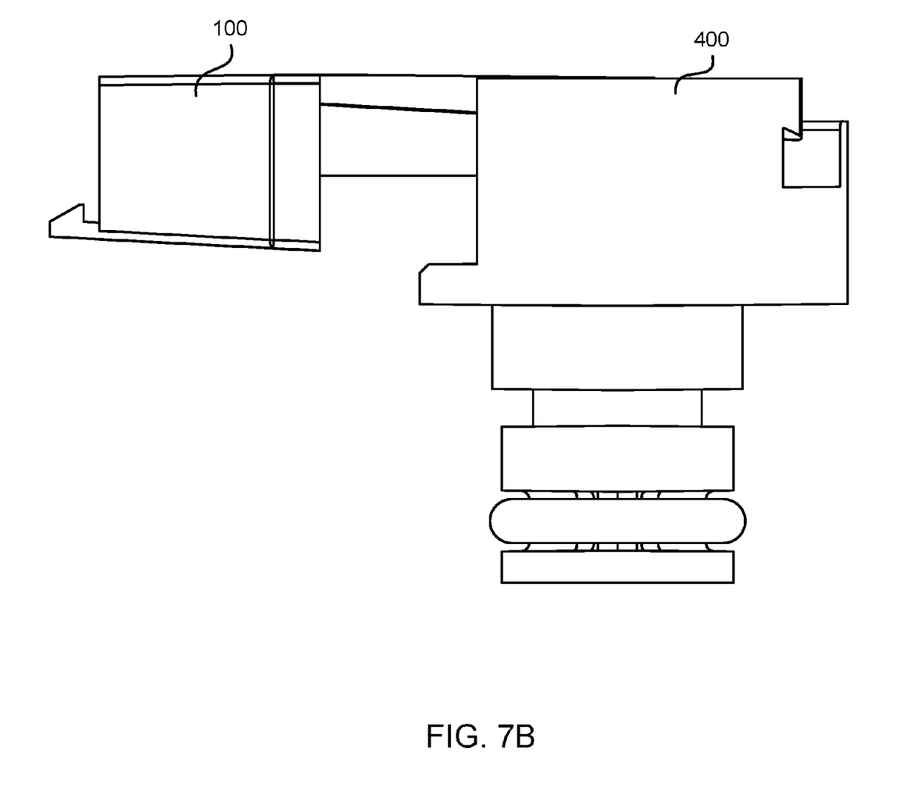

FIGS. 7A-B illustrate an example technique for assembling the pressure transducer 900. Referring to FIGS. 7A-B, seal 710 (FIG. 1B) and the third portion 500 (FIG. 6) are placed inside the cavity 416 (FIG. 5) prior to joining the first section 100 with the second section 400. The seal 710 is placed in the cavity 416 between channel 714 and the third portion 500 as shown in FIG. 1B.

The keyed section 120 enters opening 410 (FIG. 5) at the front side 418 of the second portion 400. Edges 412 and 124 act to guide and/or align the keyed section 120 in the opening 410. As the keyed section 120 progresses into the opening 410, edges 414 and 122 act to apply a downward pressure on the keyed section 120. This downward pressure is applied to the third portion 500 and causes the third portion 500 to seat in cavity 416. Moreover, the downward pressure is transferred from the third portion 500 to seal 710 in cavity 416 and causes the seal 710 to compress. The compressed seal 710 acts to seal the cavity 416 from contaminants that may otherwise enter the cavity 416 via, for example, channel 714. An example of the assembled pressure transducer 900 is illustrated in FIG. 1A.

It should be noted that friction between the first portion 100 and second portion 400 may hold these portions 100, 400 together in the assembled pressure transducer 900. This may obviate having to utilize a crimping operation when assembling pressure transducer 900.

Figure 8:
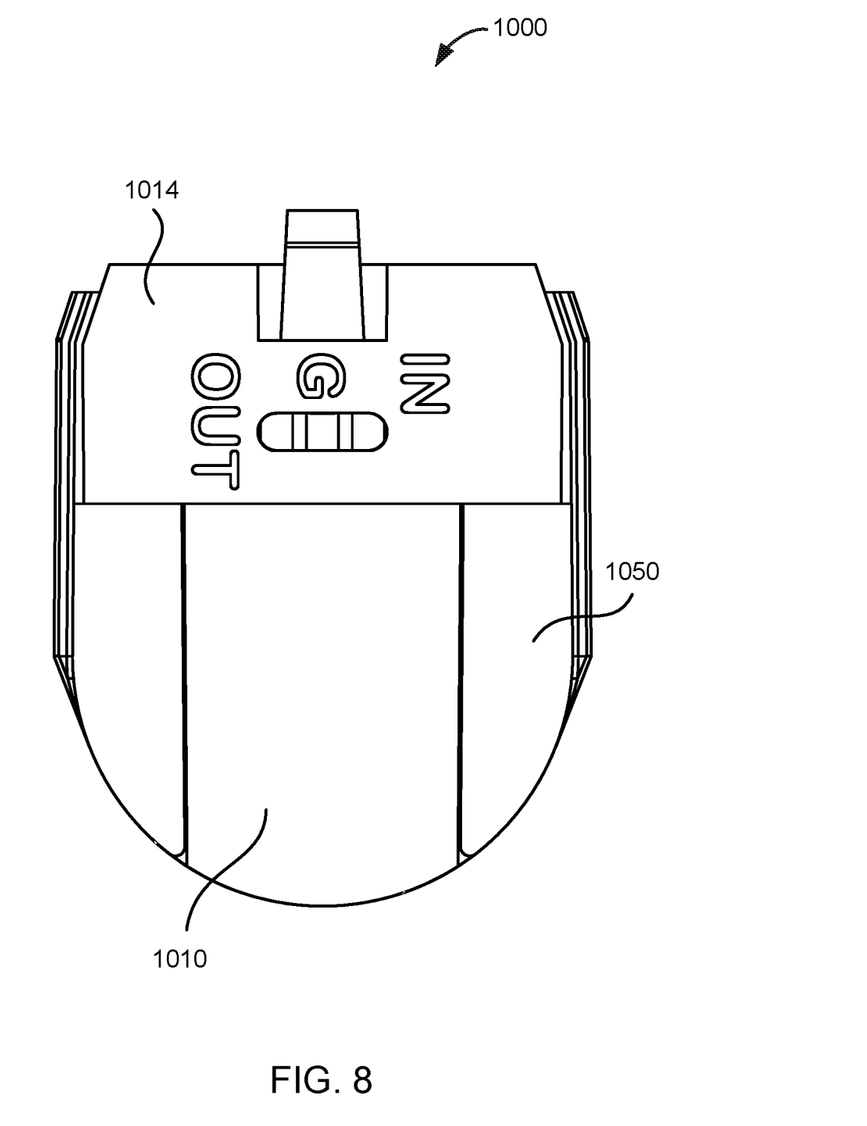
FIG. 8 illustrates a top-down view of the pressure transducer having a second embodiment of the first portion of the pressure transducer and a second embodiment of the second portion of the pressure transducer.

It should also be noted that in other embodiments, other techniques (e.g., locks, snaps) for holding portions 100 and 400 together may be used. For example, FIG. 8 illustrates a top-down view 1000 of pressure transducer 100 having a second embodiment 1010 of the first portion 100 and a second embodiment 1050 of the second portion 400 that incorporates snap members for holding the first portion 1010 and the second portion 1050 together. The first portion 1010 may include a cover 1014 which may provide protection for, inter alia, the snap members.

Figure 9A:
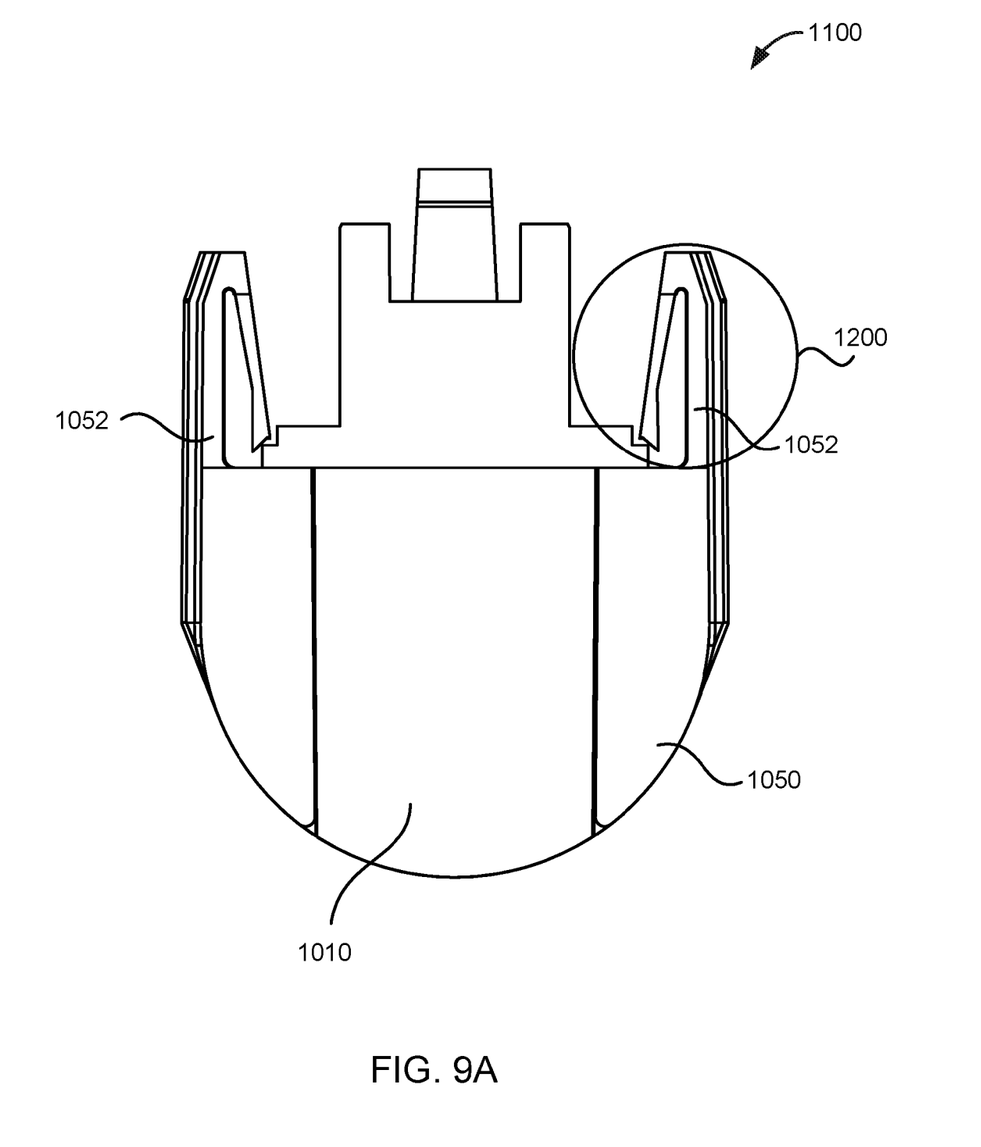
FIG. 9A illustrates a view of the pressure transducer illustrated in FIG. 8 with a cover removed and FIG. 9B illustrates an expanded view of a snap member that may be contained in the pressure transducer.

FIG. 9A illustrates a top-down view 1100 of the pressure transducer 900 illustrated in FIG. 8 with the cover 1014 removed. Referring to FIG. 9A, the second portion 1050 may include a plurality of snap members 1052. As will be described further below, the snap members 1052 may act to restrict movement of the first portion 1010 and prevent the first portion 1010 from separating from the second portion 1050 after the first portion 1010 and second portion 1050 are joined.

Figure 9B:
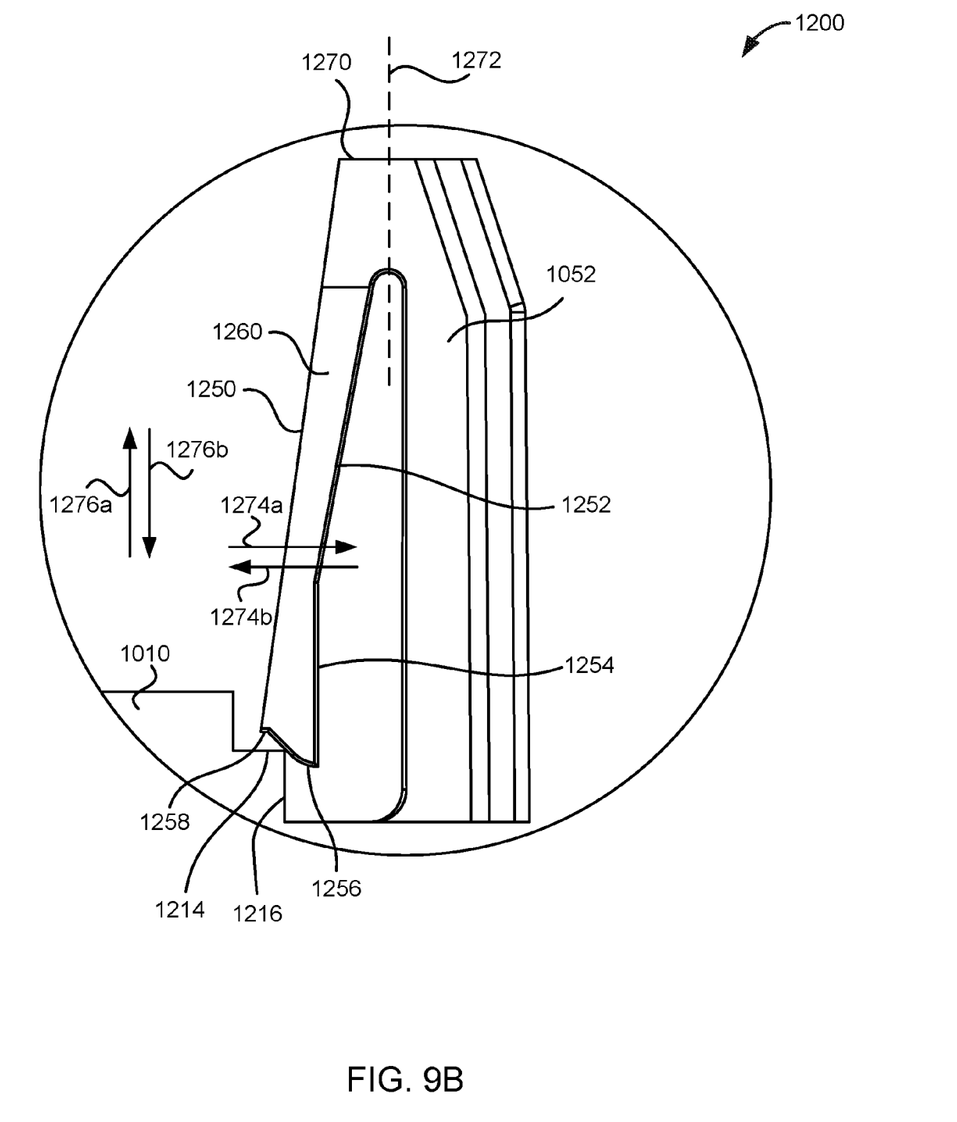

FIG. 9B illustrates an expanded view 1200 of a snap member 1052. Referring to FIG. 9B, snap member 1052 may include a prong 1260. The first portion 1010 may include edges 1214 and 1216 which may form a stop for the first portion 1010. In an embodiment, edge 1214 is perpendicular to edge 1216.

Prong 1260 may include edges 1250, 1252, 1254, 1256, and 1258. The prong 1260 may be flexible and may move after, for example, a force is applied to the first portion 1010. The prong 1260 may include a knee where edge 1252 meets edge 1254. The prong 1260 may have a proximal end and a distal end. The proximal end of the prong 1260 may be at a tip 1270 of the snap member 1052. The distal end of the prong 1260 may be open-ended (e.g., unattached) and may include edges 1256 and 1258. Edge 1256 may be adjacent to edge 1258. Note that in other embodiments, the distal end of the prong may include additional edges. As will be described further below, the snap member 1052 may allow movement of the first portion 1010 after edge 1256 meets the stop formed by edges 1214 and 1216. In addition, as will be described further below, the snap member 1052 may restrict movement of the first portion 1010 after edge 1258 meets the stop formed by edges 1214 and 1216.

Axis 1272 may be a center axis for snap member 1052. Edge 1250 may run from the proximal end of prong 1260 to edge 1258 at an angle with respect to axis 1272. This angle may be, for example, from zero to 60 degrees.

At the distal end of the prong 1260, edge 1256 may be shaped (e.g., curved) to allow a movement of the first portion 1010 after a force is applied to the first portion 1010. The force may be an extraction or an insertion force which may cause the first portion 1010 to move in a direction illustrated, for example, by lines 1276a-b, respectively. The force may occur, for example, as a result of disconnecting or connecting a connector from or to the first portion 1010, respectively. In response to the force, prong 1260 may move laterally in a direction as illustrated, for example, by lines 1274a-b.

Edge 1258 may act to restrict movement of the first portion 1010 after the force is applied to the first portion 1010. For example, suppose an extraction force is applied to a connector that is connected to the first portion 1010. The extraction force may cause the first portion 1010 to move in a direction indicated by line 1276a. Moreover, prong 1260 may move in a direction indicated by line 1274a in response to the movement of the first portion 1010. The movement of the first portion 1010 and the prong 1260 may cause edge 1258 to meet edge 1214. After edge 1258 meets edge 1214, edge 1258 may act to prevent further movement of the first portion 1010.

In an embodiment, edge 1258 may be, for example, parallel to edge 1214. In other embodiments, an end of edge 1258 may, for example, extend inward where edge 1258 meets edge 1256. Here, for example, edge 1258 may be shaped to form a v-shaped notch having an apex where edge 1258 and edge 1256 meet. It should be noted that other shapes of edge 1258 may be used to restrict movement of the first portion 1010 and/or the prong 1260. Moreover, in other embodiments, the stop formed by edges 1214 and 1216 may be shaped differently.

The foregoing description of embodiments is intended to provide illustration and description, but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A pressure transducer comprising:
   a first portion having a first edge, a second edge, and a third edge, the second edge of the first portion being adjacent to the third edge of the first portion, the second edge of the first portion and the third edge of the first portion forming a stop for the first portion;
   a second portion that is joined with the first portion, the second portion having a cavity and a snap member, the snap member having a prong, the prong having a proximal end at a tip of the snap member and a distal end that is open-ended, the distal end having a first edge and a second edge, the first edge being adjacent to the second edge;
   a seal contained in the cavity; and
   a third portion contained in the cavity, the third portion including electronic circuitry for generating a signal associated with a pressure sensed by the pressure transducer,
   wherein the first edge of the first portion applies a pressure to the third portion to compress the seal against the second portion, and
   wherein the snap member retains the first and second portion together while (1) allowing movement of the first portion when the first edge of the distal end of the prong contacts the stop and (2) restricting movement of the first portion when the second edge of the distal end of the prong contacts the stop.

2. The pressure transducer of claim 1, wherein the first portion includes a connector section to accommodate connecting the pressure transducer to an external device.

3. The pressure transducer of claim 2, wherein the first portion includes a keyed section to accommodate joining the first portion with the second portion.

4. The pressure transducer of claim 3, wherein the keyed section includes an edge that slopes downward from a point where the connector section meets the keyed section.

5. The pressure transducer of claim 4, wherein the edge slopes downward at an angle between 0 and 45 degrees.

6. The pressure transducer of claim 3, wherein the keyed section includes a first edge, a second edge, and a third edge, and
   wherein the first edge of the keyed section is adjacent to a bottom surface of the keyed section and the third edge of the keyed section, the second edge of the keyed section is adjacent to a top surface of the keyed section and the third edge of the keyed section, and the third edge of the keyed section is adjacent to the first edge of the keyed section and the second edge of the keyed section, and
   wherein the third edge of the keyed section slopes towards the second edge of the keyed section.

7. The pressure transducer of the claim 6, wherein the third edge of the keyed section slopes downwards towards the second edge of the keyed section at an angle between 0 and 90 degrees.

8. The pressure transducer of the claim 6, wherein the third edge of the keyed section slopes downwards towards the second edge of the keyed section at an angle between 0 and 90 degrees.

9. The pressure transducer of claim 1, wherein the second portion includes an opening for receiving the first portion.

10. The pressure transducer of claim 9, wherein the second portion includes an edge that acts to align the first portion with the second portion during a joining of the first portion with the second portion.

11. The pressure transducer of claim 1, wherein the first edge of the prong is curved.

12. A pressure transducer comprising:
    a first portion forming a stop; and
    a second portion connected to the first portion, the second portion having a cavity and a snap member, the snap member having a prong with a distal end having a first edge and a second edge,
    wherein the snap member retains the first and second portion together while (1) allowing movement of the first portion when the first edge of the distal end of the prong contacts the stop and (2) restricting movement of the first portion when the second edge of the distal end of the prong contacts the stop.

13. A pressure transducer as recited in claim 12, further comprising:
a seal contained in the cavity, and
a third portion contained in the cavity, the third portion including electronic circuitry for generating a signal associated with a pressure sensed by the pressure transducer,
wherein the first portion applies a pressure to the third portion to compress the seal against the second portion.

14. A pressure transducer as recited in claim 12, wherein the first edge is concave.

15. A pressure transducer as recited in claim 12, wherein the second edge is flat so that the second flat edge mates flush with a flat portion of the stop.

16. A pressure transducer as recited in claim 12, wherein the prong has a proximal portion that joins the distal portion to form a knee.

17. A pressure transducer as recited in claim 12,
wherein the first portion includes a keyed section to accommodate joining the first portion with the second portion, the keyed section including a first edge, a second edge, and a third edge,
wherein the first edge of the keyed section is adjacent to a bottom surface of the keyed section and the third edge of the keyed section, the second edge of the keyed section is adjacent to a top surface of the keyed section and the third edge of the keyed section, and the third edge of the keyed section is adjacent to the first edge of the keyed section and the second edge of the keyed section, and
wherein the third edge of the keyed section slopes towards the second edge of the keyed section.

18. A pressure transducer comprising:
a first portion having a first edge, a second edge, and a third edge, the second edge of the first portion being adjacent to the third edge of the first portion, the second edge of the first portion and the third edge of the first portion forming a stop for the first portion;
a second portion that is joined with the first portion, the second portion having a cavity and a snap member, the snap member having a prong, the prong having a proximal end at a tip of the snap member and a distal end that is open-ended, the distal end having a first edge and a second edge, the first edge being adjacent to the second edge;
a seal contained in the cavity; and
a third portion contained in the cavity, the third portion including electronic circuitry for generating a signal associated with a pressure sensed by the pressure transducer,
wherein the first edge of the first portion applies a pressure to the third portion to compress the seal,
wherein the snap member (1) allows movement of the first portion after the first edge of the distal end of the prong meets the stop and (2) restricts movement of the first portion after the second edge of the distal end of the prong meets the stop,
wherein the first portion includes a connector section to accommodate connecting the pressure transducer to an external device,
wherein the first portion includes a keyed section to accommodate joining the first portion with the second portion,
wherein the keyed section includes a first edge, a second edge, and a third edge, and
wherein the first edge of the keyed section is adjacent to a bottom surface of the keyed section and the third edge of the keyed section, the second edge of the keyed section is adjacent to a top surface of the keyed section and the third edge of the keyed section, and the third edge of the keyed section is adjacent to the first edge of the keyed section and the second edge of the keyed section, and
wherein the third edge of the keyed section slopes towards the second edge of the keyed section.

\* \* \* \* \*